E. MORF.
METHOD OF PRODUCING BODIES OR SMALL PARTICLES OF SUBSTANCES.
APPLICATION FILED DEC. 2, 1912.

1,128,175.

Patented Feb. 9, 1915.

Witnesses:
P. Dommers
E. Leckert.

Inventor:
Erika Morf.
By Henry Orth Jr.
Atty.

UNITED STATES PATENT OFFICE.

ERIKA MORF, OF ZURICH, SWITZERLAND, ASSIGNOR, BY MESNE ASSIGNMENTS, TO METALS COATING COMPANY OF AMERICA, OF BOSTON, MASSACHUSETTS, A CORPORATION OF MASSACHUSETTS.

METHOD OF PRODUCING BODIES OR SMALL PARTICLES OF SUBSTANCES.

1,128,175.   Specification of Letters Patent.   Patented Feb. 9, 1915.

Application filed December 2, 1912.   Serial No. 734,547.

*To all whom it may concern:*

Be it known that I, ERIKA MORF, a citizen of Switzerland, residing at Hardturmstrasse 78, Zurich, III, Switzerland, have invented certain new and useful Improvements in Methods of Producing Bodies or Small Particles of Substances; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a method according to which glass or other substances hereinafter referred to, preferably in the form of rod or wire, is melted, divided and thrown onto a surface under considerable pressure, whereby cohesive coatings of any desired thickness are produced.

The principle of the invention consists in confining the quantity of material melted to that amount which is thrown on; for instance the end of a glass rod is melted successively by a blow pipe flame in any suitable manner or otherwise as hereinafter described, and the molten drops of glass formed thereby are simultaneously thrown onto the aforesaid surface by means of compressed air, steam or compressed gases.

Figure 1:
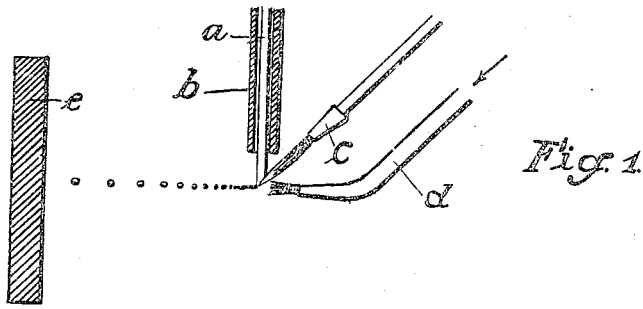
Figure 2:
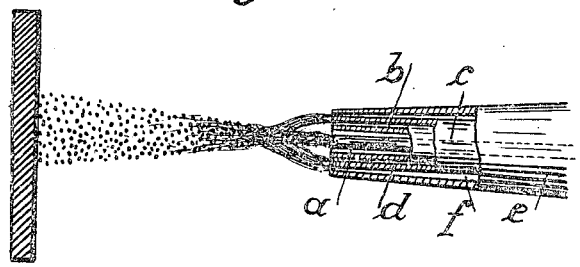
Figure 3:
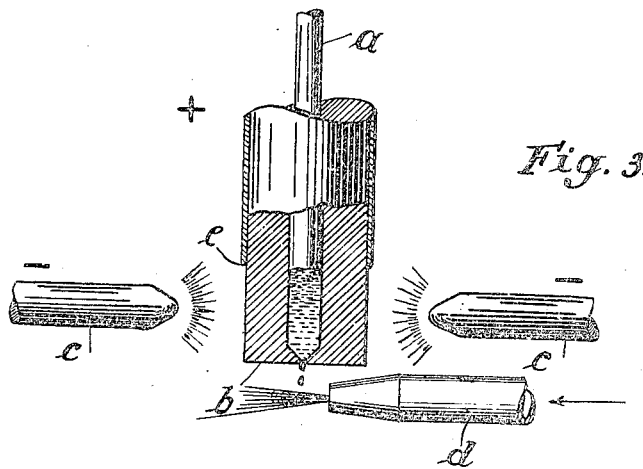

Figure 1 is a diagrammatical view of the operation. Fig. 2 is a view of a modification and Fig. 3 is a further modification.

*a* is a glass rod which is fed forward uniformly or intermittently in the guide sleeve *b*, the lower end of said rod being melted away by a flame *c*. The drops of molten glass rapidly formed in succession thereby are driven with great force by a special conveying blast, from the pipe *d* onto a preferably heated surface *e*, whereby mutually united and welded coats of glazing of an amorphous structure are formed. The glass rod may also be melted by means of a blow flame concentrically surrounding such rod, the molten drops of glass formed thereby being thrown onto the surface by the pressure of the flame, assisted if necessary, by likewise concentrically fed compressed air (or vapors or gases), whereby the use of readily fluxible material (soda and oxid of lead glass) and highly compressed and heated air effects a more or less fine disintegration of the molten drops of glass.

Fig. 2 shows the operation with a concentrically fed flame, *a* being the glass rod which is moved forward in the pipe *b* at a uniform speed. Between the two pipes *b* and *c* there is a hollow space *d* through which is fed a combustible gas or gas mixture (for example, lighting gas, oxy-hydrogen gas, acetylene); the compressed air required for the disintegration and throwing on operation issues through the hollow space *f* between the pipes *c* and *e*.

It will be obvious that the size, pressure of gas, chemical nature of the flame and composition of the material to be melted are of great importance for obtaining the most favorable effects; it is also necessary that the other factors, such as the thickness of glass rod, the speed at which the rod is fed forward, the quantity, temperature and pressure of the conveying blast, as well as the distance of the surface to be coated from the blow-apparatus, should be in a certain relative ratio, which can be readily ascertained by experiments. The glass may also be melted by electrical means, as for instance with the aid of the device shown in Fig. 3, or by directing an arc light by magnetic action toward the end of the glass rod.

*a* is the glass rod which is fed downward in the graphite tube *b* which simultaneously serves as an electrode and guide tube.

The two solid carbon sticks *c* form the negative electrodes which are arranged in such manner that only the lowest part of the tube *b* is rendered incandescent and consequently only the lowest part of the glass rod is melted. Instead of melting away the glass in the form of a thin rod, the material to be melted may also be fed to the hollow space in the tube *b*, in the form of granules or flexible cables.

*d* is the duct for the preferably heated conveying blast. In order to localize as far as possible the heating of the sleeve electrode *b*, the latter is preferably provided with a thick coating of copper reaching to the line *e*; to this end the electrode *b* may also be reduced in cross section at its lower end.

Inversely, the material to be melted may be fixed in position and the melting and throwing on device may be movably arranged. The latter may for instance be arranged so that with two nozzles arranged one above the other, a hot blow flame issues from the upper one while the lower one effects the throwing on operation.

The coats may be permanently or detachably applied resulting in the latter case in the production of self-formed bodies. When using an arrangement according to Fig. 1 or 2, a hollow rod or a tube may be used instead of the solid rod to be melted, such tube containing internally a flux which will increase the fluxity of the material used, or, when metals are used, will have a reducing effect.

It will be obvious that a large number of practical appliances are feasible, those above only being mentioned as examples. Fusible substances, metals and so forth in the form of rods, tubes, granules or mixed sets may be treated in the manner above described instead of glass.

Having now particularly described and ascertained the nature of my said invention and in what manner the same is to be performed, I declare that what I claim is:

1. In the production of cohesive coatings, the step in the method of forming the spray therefor, which consists in subjecting a body of solid material to the simultaneous disintegrating action of a melting heat and an atomizing jet.

2. In the production of cohesive coatings, the step in the method of forming the spray therefor, which consists in subjecting a piece of solid material to a simultaneous melting and atomizing zone, and effecting a relative feeding movement between the piece and zone.

3. In the production of cohesive coatings, the step in the method of forming the spray therefor, which consists in subjecting a surface portion of a piece of material to the disintegrating action of a heating flame and an atomizing jet of a gas simultaneously, whereby the material of the piece is melted, atomized and projected.

4. In the production of cohesive coatings, the step in the method of forming the spray therefor, which consists in subjecting a portion of a piece of material to the disintegrating action of a heating flame and an atomizing jet of a gas simultaneously, whereby the material of the piece is melted, atomized and projected, and feeding the piece of material commensurate with its melting rate.

5. In the production of cohesive coatings, the step in the method of forming the spray therefor, which consists in feeding a rod of material into a surrounding melting and projecting jet of gas.

6. In the production of cohesive coatings, the step in the method of forming the spray therefor, which consists in feeding a rod of material into a surrounding melting and projecting gas, and feeding the rod substantially commensurate with its melting rate.

7. In the production of cohesive coatings, the step in the method of forming the spray therefor, which consists in feeding a rod of material into a surrounding melting and projecting gas having a reducing action on the material of the rod, and feeding the rod substantially commensurate with its melting rate.

8. In the production of cohesive coatings, the step in the method of forming spray therefor, which consists in feeding a rod of solid material to a melting and atomizing jet having a reducing action on the material composing said rod.

9. In the production of cohesive coatings, the step in the method of forming the spray therefor, which consists in subjecting a rod of material containing a flux to the simultaneous action of a melting heat and an atomizing jet.

10. In the production of cohesive coatings, the step in the method of forming the spray which consists in subjecting a hollow rod of material containing therein a flux to the simultaneous action of a melting heat and an atomizing jet.

11. In the production of cohesive coatings, the step in the method of forming the spray therefor, which consists in subjecting a rod of material to the simultaneous action of a melting heat and an atomizing jet having a reducing action on the material of the rod.

12. In the production of cohesive coatings, the step in the method of forming the spray therefor, which consists in subjecting a rod of material to the simultaneous action of a melting heat and an atomizing jet of reducing gas, feeding into the zone of action of said jet and controlling the quantity of gas and rate of feeding of the rod to control the character of the coating.

13. In the production of cohesive coatings, the step in the method of forming the spray therefor, which consists in subjecting a body of solid material to the disintegrating action of a melting and atomizing zone, and confining the quantity of material melted to substantially the amount atomized.

14. In the production of cohesive coatings, the step in the method of forming the spray therefor, which consists in subjecting a rod of solid material to the disintegrating action of a melting heat and an atomizing jet having a reducing action on the material composing said rod, and confining the quantity of material melted to substantially the amount atomized.

15. In the production of cohesive coatings, the step in the method of forming the spray therefor, which consists in subjecting a rod of material containing a flux to the disintegrating action of a melting heat and an atomizing jet, and confining the quantity of material melted to substantially the amount atomized.

In testimony that I claim the foregoing as my invention, I have signed my name in presence of two subscribing witnesses.

ERIKA MORF.

Witnesses:
P. ZOLLER,
CARL GRUBLER.